Oct. 30, 1923.                                                                1,472,693
H. S. SPLITHOFF
HEAT REGULATOR FOR OVENS
Filed March 3, 1922                               2 Sheets-Sheet 2
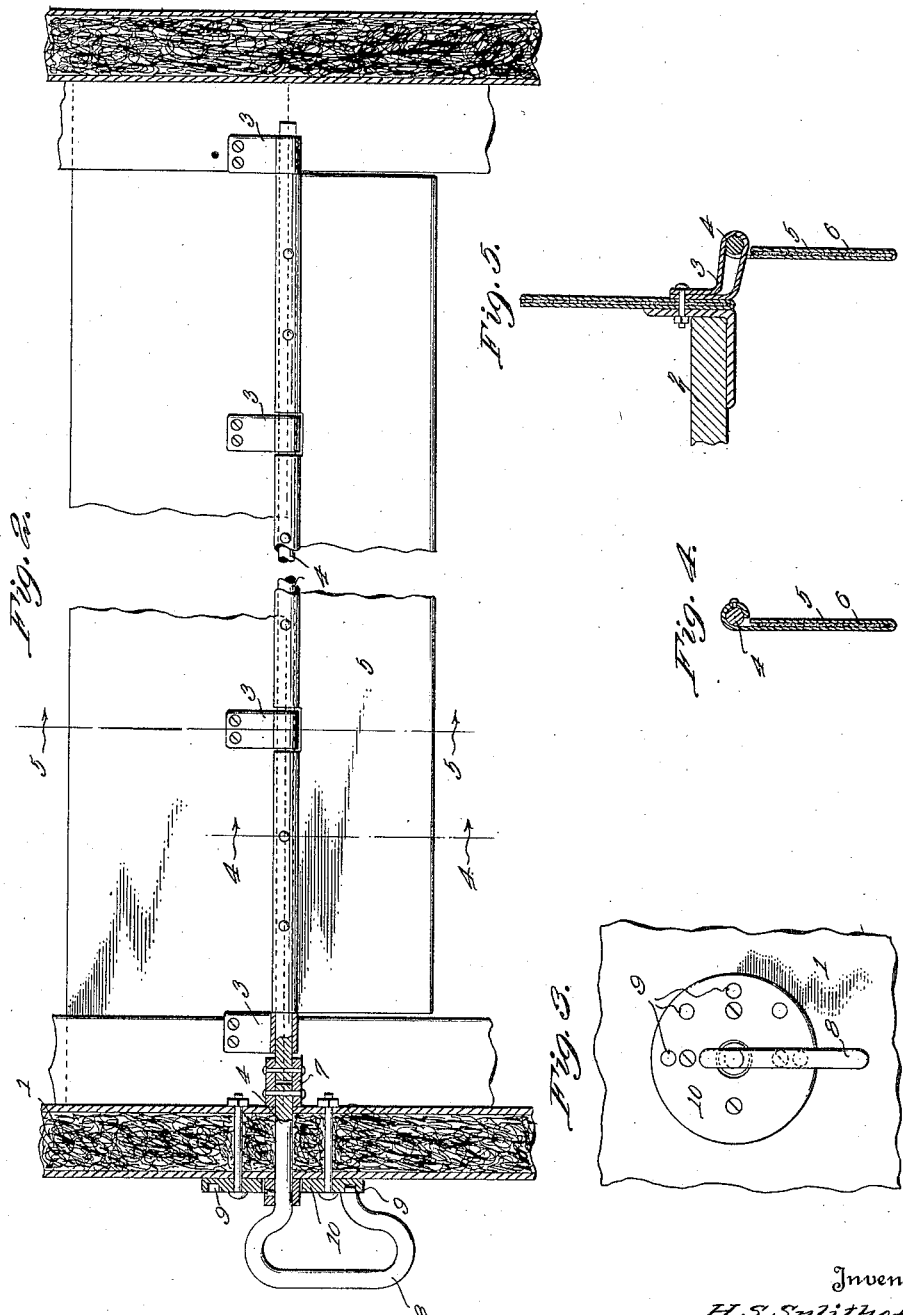
Inventor
H. S. Splithoff
By Victor J. Evans
Attorney Patented Oct. 30, 1923.

1,472,693

UNITED STATES PATENT OFFICE.

HARRY S. SPLITHOFF, OF CHICAGO, ILLINOIS, ASSIGNOR OF ONE-HALF TO ROBERTS PORTABLE OVEN COMPANY, OF CHICAGO, ILLINOIS,

HEAT REGULATOR FOR OVENS.

Application filed March 3, 1922. Serial No. 540,818.

*To all whom it may concern:*

Be it known that I, HARRY S. SPLITHOFF, a citizen of the United States, residing at Chicago, in the county of Cook and State of Illinois, have invented new and useful Improvements in Heat Regulators for Ovens, of which the following is a specification.

This invention relates to improvements in ovens, the general object of the invention being to provide means for controlling the circulation of hot air through the oven.

Another object of the invention is to provide a number of baffle plates which are adjustable to different positions so that the circulation of air to the different decks can be controlled.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is a sectional view taken at right angles to Figure 1 and showing one of the baffle plates 5 in raised position.

Figure 3 is a fragmentary front view showing the means for holding the handle 8 in adjusted position.

Figure 4 is a section on line 4—4 of Figure 2.

Figure 5 is a section on line 5—5 of Figure 2.

Figure 1:
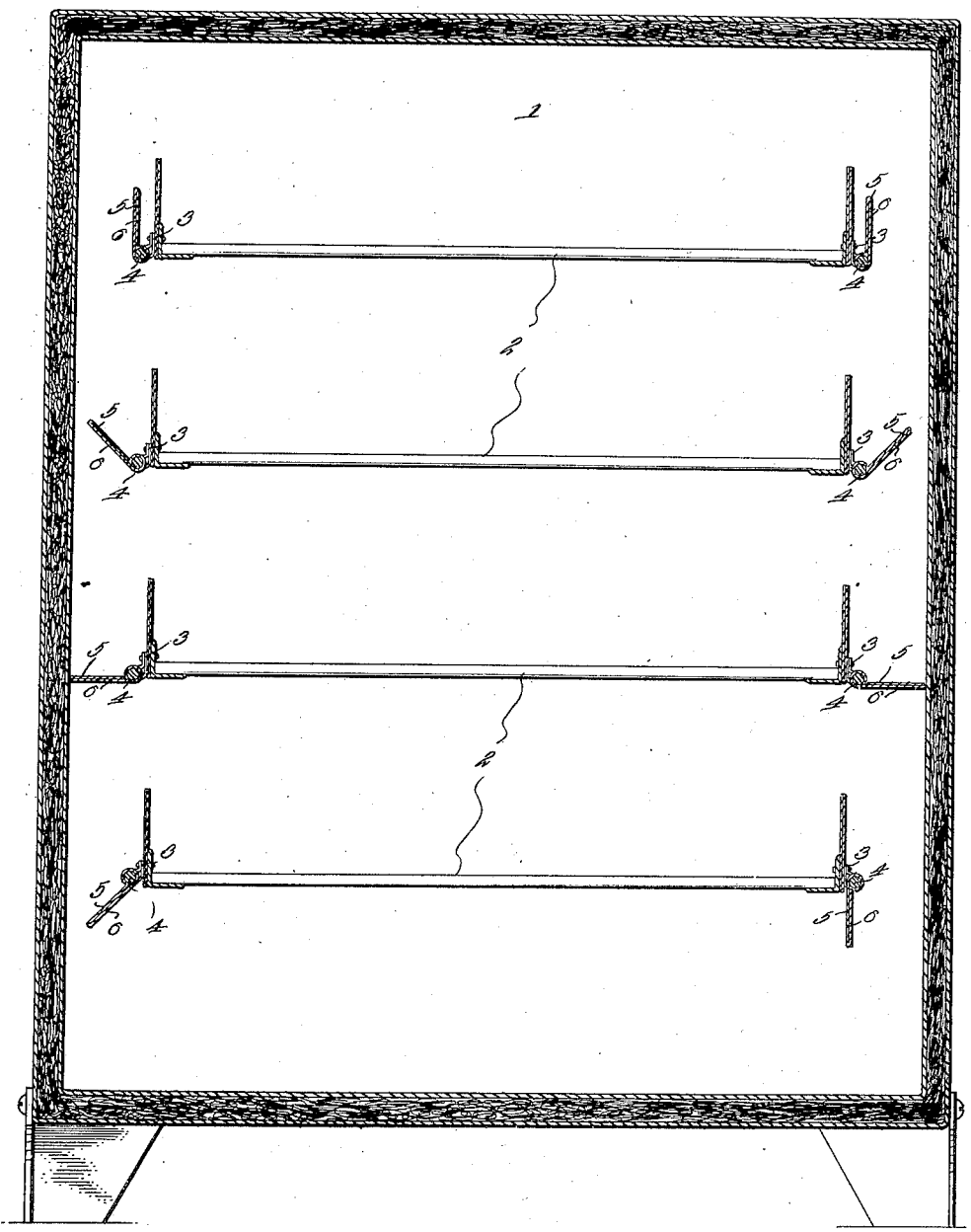
Figure 1 is a sectional view of an oven showing my invention in use.

In these views 1 indicates the oven and 2 the decks therein. In carrying out my invention I secure brackets 3 to the edges of some of the decks, these brackets acting as supports for the shafts 4. These shafts carry the baffle plates 5 which are covered with asbestos or the like, as shown at 6. These plates are so formed that when moved into a horizontal position they will close the space between the decks and the side walls of the oven and thus prevent the passage of heated air through such spaces.

Each shaft has secured thereto, by means of the coupling 7, a handle 8 which is of substantially U-shape with one limb longer than the other. This long limb passes through the oven face and is coupled to the shaft and the other limb has its extremity reduced and adapted to engage any one of a series of holes 9 formed in a dial plate 10 which is secured to the oven and has a hole in its center through which the long limb of the handle passes. This handle is made slightly flexible so that the short limb can be moved out of engagement with the holes or recesses 9.

It will thus be seen that the baffle plates can be moved to various positions from the outside of the oven and that they will be held in adjusted position by the handle and recesses.

My invention acts as a heat controlling device for the oven, a heat distributor for the oven, a heat control for each deck of the oven, adjustable baffle plates for the oven and baffle plates adjustable to five positions, as follows:

A. Heat regulating.
B. Heat control.
C. Heat holding.
D. Heat changing on the various decks.
E. Heat releasing.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with an oven and its decks, brackets connected with the side edges of each deck, a plate hinged to each bracket, a handle connected with each plate and extending through the front of the oven and means for holding the handle in a position with the plate closing the space between the deck and the side wall of the oven or for holding the plate in fully open position or partly open position.

2. In combination with an oven and its decks, brackets connected with the side edges of each deck, a plate hinged to each bracket, a handle connected with each plate and extending through the front of the oven, means for holding the handle in a position with the plate closing the space between the deck and the side wall of the oven or for holding the plate in fully open position or partly open position, such means consisting of a plate on the front of the stove having a plurality of holes therein and the handle having a spring part, the extremity of which is adapted to engage any one of said holes.

In testimony whereof I affix my signature.

HARRY S. SPLITHOFF.